United States Patent
Means

[11] 3,893,544
[45] July 8, 1975

[54] PNEUMATIC-HYDRAULIC BRAKE APPARATUS FOR A FOUR-WHEEL TRUCK
[75] Inventor: Donald C. Means, Export, Pa.
[73] Assignee: Westinghouse Air Brake Company, Wilmerding, Pa.
[22] Filed: Mar. 13, 1974
[21] Appl. No.: 450,871

[52] U.S. Cl.............. 188/52; 60/547; 188/153 R; 188/196 A; 188/351
[51] Int. Cl............................................. B61h 13/24
[58] Field of Search........... 188/153 R, 351, 196 A, 188/52; 192/111 A; 60/547

[56] References Cited
UNITED STATES PATENTS

| | | | |
|---|---|---|---|
| 2,511,336 | 6/1950 | Hudson.......................... | 188/153 R |
| 2,514,588 | 7/1950 | Nystrom et al. ............... | 188/153 R |
| 2,746,575 | 5/1956 | Kinchin............................ | 118/351 |
| 2,958,398 | 11/1960 | Newell......................... | 188/153 R X |
| 3,035,871 | 5/1962 | Giampapa et al.............. | 188/351 X |
| 3,078,676 | 2/1963 | Blair................................. | 188/351 |
| 3,637,054 | 1/1972 | Billeter....................... | 188/196 A X |

*Primary Examiner*—George E. A. Halvosa
*Attorney, Agent, or Firm*—W. F. Poore; R. W. McIntire, Jr.

[57] ABSTRACT

This invention relates to a pneumatically controlled hydraulically actuated brake apparatus of the constant brake shoe clearance type for a two-axle four-wheel vehicle truck wherein a constant brake shoe clearance is obtained by supplying a quantity of hydraulic fluid to a chamber formed between the wall surfaces of a cylinder and an actuating piston slidably disposed in the chamber in accordance with the increase in volume of the chamber as the result of brake shoe wear while a brake application is in effect and thereafter, upon effecting a brake release, always releasing the same quantity of hydraulic fluid from this chamber irrespective of the degree of brake shoe and/or wheel wear occurring while the prior brake application was in effect.

11 Claims, 2 Drawing Figures

PNEUMATIC-HYDRAULIC BRAKE APPARATUS FOR A FOUR-WHEEL TRUCK

BACKGROUND OF THE INVENTION

In U.S. Pat. No. 2,958,398, issued Nov. 1, 1960, to George K. Newell, and assigned to the assignee of the present application, there is shown a brake rigging for a two-axle four-wheel railway vehicle truck that includes two brake beams each of which carries thereon a brake cylinder, the piston rod of which is secured to the other brake beam. Each end of each brake beam is provided with a guide foot and the two guide feet of each brake are slidably supported in grooved wear plates which are secured respectively to the two side frame members of the vehicle truck.

The brake cylinder carried by each brake beam is mounted non-symmetrically thereon. Consequently, each brake cylinder tends to rotate the respective brake beam in the grooved wear plates thereby producing unequal wear at the respective ends of both guide feet and also the brake shoes. Actual experience with the type of brake rigging shown in the above-mentioned patent has disclosed that the unequal wear on the ends of the guide feet while the brakes are released in greater than while the brakes are applied. Of course all unequal wear of both the guide feet and the brake shoes is undesirable.

Moreover, the longitudinal axis of the brake cylinder carried on each brake beam is parallel to the longitudinal axis of the vehicle truck. Consequently, the length of this brake cylinder is limited to a value that is somewhat less than the distance between the brake beam and the adjacent axle of the truck. Therefore, the length of the bore in the casing of the brake cylinder cannot be of such magnitude as to provide sufficient travel for the brake cylinder piston, in addition to that required to effect contact of the brake shoes with the tread surface of the wheels, that, as the brake shoes wear away, the shoes are always properly moved into braking contact with the tread surface of the wheels of the truck during each brake application throughout their useful life without the necessity of a slack adjuster to compensate for wear of the brake shoes.

Accordingly, it is the general purpose of the present invention to provide a novel pneumatically controlled hydraulically actuated brake apparatus or rigging for a two-axle four-wheel railway vehicle truck having a hydraulic-pneumatic master cylinder disposed transversely between the side frames of the truck and resiliently secured to one of two parallel spaced-apart brake-shoe-carrying brake beams arranged on opposite sides of the truck bolster. Hydraulic fluid under pressure is supplied from this master cylinder via suitable conduits to each one of a pair of hydraulic brake actuators of small diameter, each actuator being disposed between and operatively connected to each one of the pair of the brake beams adjacent one end thereof at such a location as to be sufficiently disposed below the truck bolster adjacent the respective opposite ends thereof as to enable free movement of these actuators to effect movement of the brake-beam-carried brake shoes into braking contact with the tread surface of the corresponding truck wheels irrespective of the load on the vehicle whenever a brake application is effected without interference by the bolster.

SUMMARY OF THE INVENTION

According to the present invention, a novel pneumatically controlled hydraulically actuated brake rigging or apparatus for a two-axle four-wheel vehicle truck comprises a hydraulic-pneumatic master cylinder disposed transversely between the side frames of the truck and resiliently secured to one of two spaced-apart brake-shoe-carrying light weight brake beams which are supported by a guide foot secured to or formed integral with each end of each brake beam thereby enabling movement of these beams in opposite directions as these guide feet have sliding contact in corresponding grooves in respective wear plates and guide members formed in the side frames by a pair of brake actuators of small diameter which are supplied with hydraulic fluid under pressure from the master cylinder via suitable conduits. Each brake actuator compises a fluid motor including a cylinder operatively connected to one brake beam adjacent one end thereof and a spring-biased piston slidably mounted in the cylinder and having a piston rod connected to the other brake beam adjacent the corresponding end thereof whereby equal forces are applied directly to all wheels of the truck.

Disposed in the outlet conduit from the master cylinder is a shuttle valve device that is operative by the hydraulic fluid under pressure supplied by the master cylinder to simultaneously establish a communication through which the hydraulic fluid under pressure is supplied to the brake actuators to cause a brake application, close a communication between these actuators and a volume chamber, and open a communication between this volume chamber and a storage reservoir that supplies hydraulic fluid to the master cylinder via a check valve device. Successive operations of this check valve device and the shuttle valve device as the brakes are applied and thereafter released provide for the supply of hydraulic fluid to the brake actuators as the brake shoes wear away and the return of a constant quantity of hydraulic fluid from the actuators to the storage reservoir upon each successive brake application and subsequent brake release notwithstanding the degree of brake shoe wear occurring while a brake application is in effect thereby insuring a constant brake shoe clearance while the brakes are released.

DESCRIPTION

Figure 1:
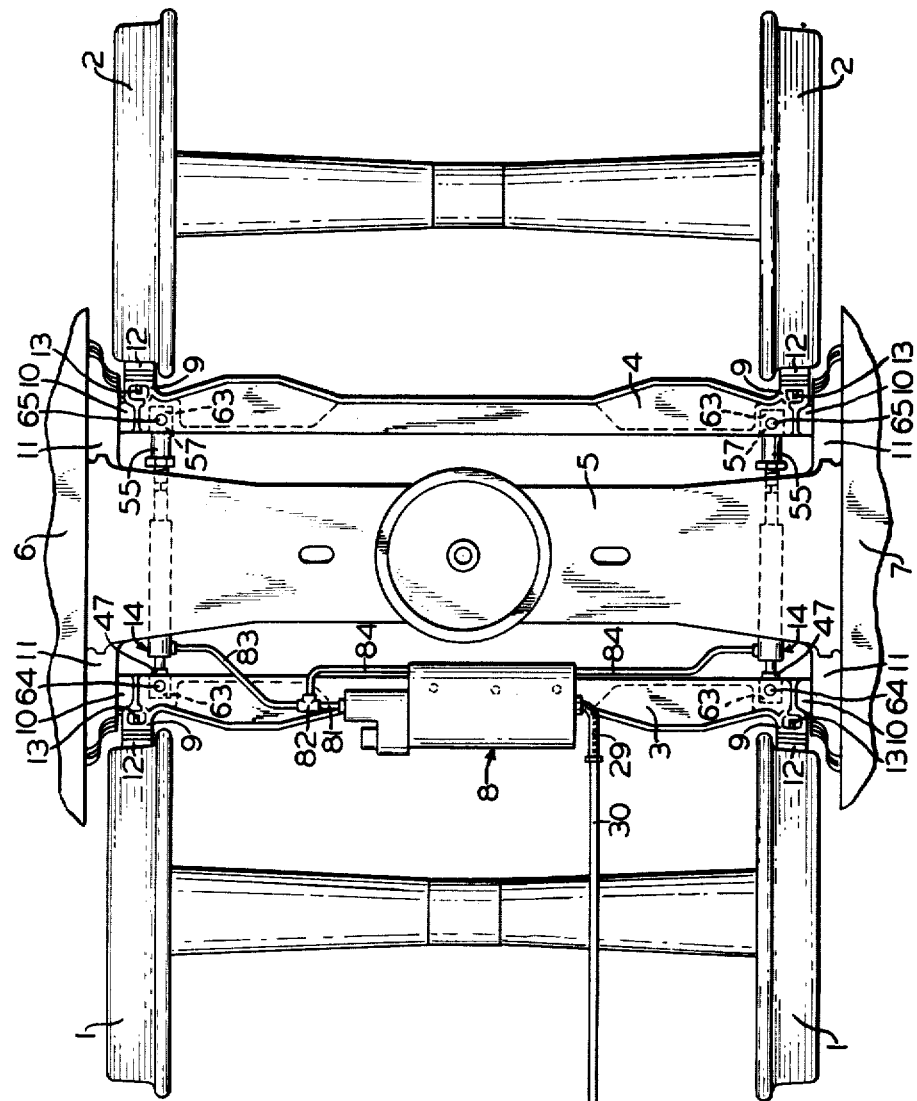
FIG. 1 is a plan view, in outline, of a pneumatically controlled hydraulically actuated brake rigging for a two-axle four-wheel railway vehicle truck, embodying the invention.
Figure 1:
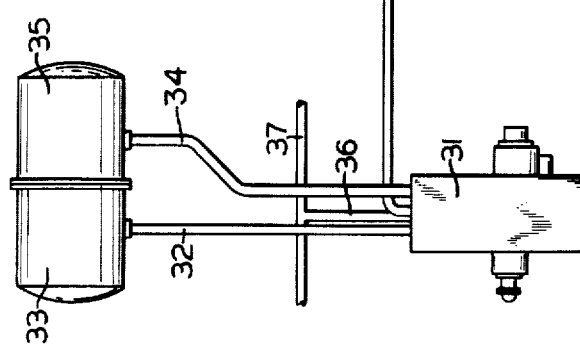

Referring to FIG. 1 of the drawings, the reference numerals 1 and 2 designate respectively wheels secured at opposite ends of each of two axles of a two-axle four-wheel railway vehicle truck.

The brake rigging shown in the drawings comprise two cast brake beams 3 and 4 which extend crosswise of the vehicle truck and in parallel spaced relation to each other and to a truck bolster 5. The brake beams 3 and 4 are symmetrically arranged on opposite sides of the truck bolster 5 and are movably supported at each end on the truck side frame members 6 and 7.

The construction of the brake beams 3 and 4 may be the same as that shown in the copending application of Donald C. Means, Ser. No. 443,766, filed Feb. 19, 1974.

Briefly, the brake beams 3 and 4 each have, for a portion of their length extending in each direction from a point midway the ends thereof, the shape of a T-beam to provide a support on the brake beam 3 for a hydraulic-pneumatic master cylinder 8.

A brake head 9 is attached in the manner disclosed in the above-mentioned copending application to each end of the brake beams 3 and 4 adjacent to and on the inboard side of a guide foot 10. Each foot 10 is a flat L-shaped metal member one leg of which is integral with the brake beam. The other leg of this guide foot 10 is slidably supported in a grooved wear plate and guide member 11, this wear plate and guide member being secured to the corresponding one of the truck side frame members 6 and 7. The wear plate and guide members and the guide feet serve to support the brake beams 3 and 4 at the proper height above the rails, (that is, somewhat below the horizontal diameter of the wheels). The groove in the wear plate and guide member 11 is disposed at a slight angle to the horizontal to permit bodily movement of the brake beams in a direction radially of the associated wheels when a brake application is made.

Each brake head 9 carries a composition brake shoe 12 for contact with the tread surface of an associated wheel. In customary manner the shoe 12 has a backing plate provided with a key bridge to receive a key 13 for removably locking the shoe 12 to the brake head 9.

The brake shoes 12 are operated into and out of contact with their associated wheels 1, 2 by means of a pair of identical hydraulic brake actuators 14 hereinafter described in detail.

In order to secure the master cylinder 8 to the horizontal leg of the T-beam portion of brake beam 3, this horizontal portion is provided with three parallel spaced-apart smooth bores 15 through each of which extends a cap screw 16 that has screw-threaded engagement with a coaxial screw-threaded bottomed bore provided therefor in a casing 17 of the master cylinder 8, it being noted that a resilient pad 18, constructed of some suitable material such as, for example rubber, and having therein a plurality of parallel spaced-apart smooth bores through which the cap screws 16 extend, is interposed between the horizontal leg of the brake beam 3 and the casing 17. The purpose of providing the resilient pad 18 is to reduce the vibration of the master cylinder 8.

Figure 2:
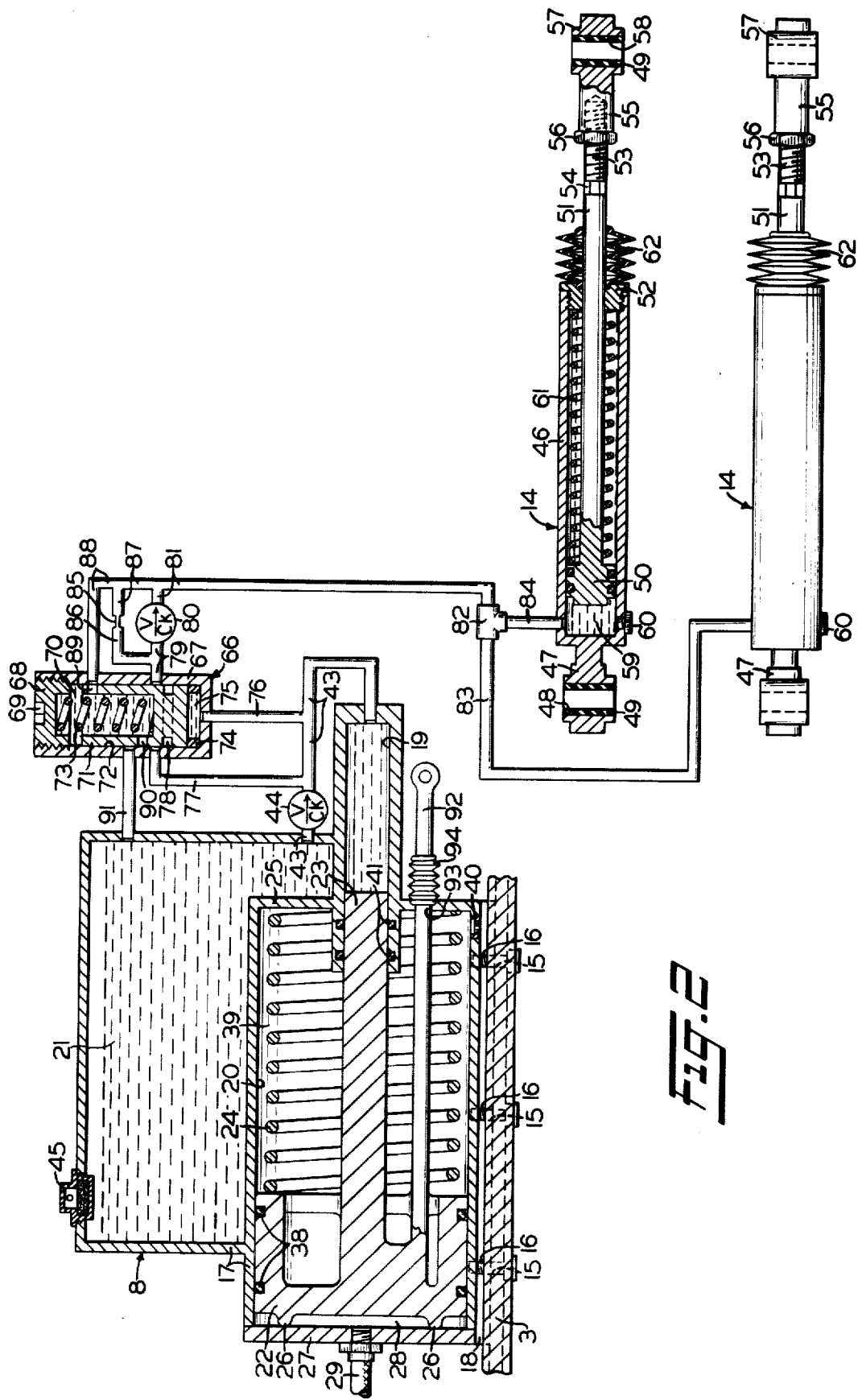
FIG. 2 is a diagrammatic view of the pneumatically controlled hydraulically actuated brake rigging shown in FIG. 1, certain elements of the brake rigging being shown on a larger scale than in FIG. 1.

As shown in FIG. 2, the casing 17 has formed therein a bottomed bore 19, a coaxial counterbore 20 and a hydraulic fluid reservoir 21. A pneumatic pressure actuated piston 22 is slidably mounted in the counterbore 20 and has formed integral with one side thereof a master hydraulic piston 23 the right-hand end of which is received in the bottomed bore 19.

A spring 24 interposed between piston 22 and a wall 25 located at the right-hand end of counterbore 20 serves to yieldingly bias pistons 22 and 23 in a brake releasing direction to the position in which they are shown in FIG. 2 of the drawings.

Formed on the left-hand face of the piston 22 are a plurality of lugs 26, only two appearing in FIG. 2, which, when the pistons 22 and 23 occupy the position shown in FIG. 2, contact an end cover or pressure head 27, secured by any suitable means (not shown) to the casing 17, to form a pressure chamber 28. Pneumatic fluid under pressure may be supplied to the chamber 28 via a hose 29 (FIG. 2) that is connected to one end of a pipe 30 (FIG. 1) that at its opposite end is connected to such as the brake cylinder port of the usual brake control valve device 31 of the usual air brake equipment on railway vehicles under the control of the operator or locomotive engineer.

The construction and operation of the brake control valve 31 (FIG. 1) may be the same as that shown and described in U.S. Pat. No. 3,175,869, issued Mar. 30, 1965, to Walter B. Kirk and assigned to the assignee of the present invention, and since this control valve forms no part of the present invention, a further description is believed to be unnecessary.

As explained in the above-mentioned U.S. Pat. No. 3,175,869, the brake control valve 31 (FIG. 1? is connected by a pipe 32 to an auxiliary reservoir 33, a pipe 34 to an emergency reservoir 35, and a pipe 36 to the usual brake pipe 37 which extends from end to end of each railway vehicle.

As shown in FIG. 2, the piston 22 is provided with a pair of spaced-apart circumferential grooves in each of which is disposed an O-ring seal 38 to prevent flow of pneumatic fluid under pressure from the pressure chamber 28 at the left-hand side of this piston 22 to a non-pressure chamber 39 at the right-hand side of this piston, it being noted that this chamber 39 is open to atmosphere via a breather device 40 carried by the casing 17.

As is also shown in FIG. 2, the wall surface of the bottomed bore 19 adjacent the left-hand end thereof has formed therein a pair of spaced-apart annular grooves in each of which is disposed an O-ring seal 41 to prevent flow of hydraulic fluid under pressure from the bottomed bore 19 to the non-pressure chamber 39.

The hydraulic fluid reservoir 21 is connected to the interior of the bottomed bore 19 by way of a pipe 43 in which is disposed a one-way flow check valve device 44 that provides for flow of hydraulic fluid from the reservoir 21 to the interior of bottomed bore 19 and prevents flow in the opposite direction. The reservoir 21 may be filled with oil or some other suitable hydraulic fluid through a vented filling cap 45 screw-threaded into the casing 17.

As shown in FIG. 2 of the drawings, each of the hydraulic brake actuators 14 comprises a cup-shaped cylinder 46 that adjacent its open end is provided with internal screw threads. The closed end of the cylinder 46 has formed integral therewith an arm 47 that is provided with a bore 48 in which is disposed a resilient bushing 49 that may be formed of, for example, hard rubber.

Slidably mounted in the cup-shaped cylinder 46 is a piston 50 that has formed integral therewith a piston rod 51 which extends through an annular screw-threaded plug 52 having screw-threaded engagement with the internal screw threads adjacent the open end of the cylinder 46. The exterior end of the piston rod 51 is provided with external screw-threads 53 and adjacent the inner end of these screw threads a wrench-receiving hexagon 54 is formed on the rod 51 by, for example, a milling operation.

As shown in FIG. 2, an end member 55 is provided at one end with an internally threaded bottomed bore for receiving therein the screw threads 53 formed on the end of the piston rod 51. A lock nut 56 enables the end member 55 to be locked in any desired position relative to the piston rod 51.

Adjacent its right-hand end, the end member 55 is provided with an arm 57 through which extends a bore 58 in which is disposed a resilient bushing that may be identical to the above-mentioned bushing 49, it being noted that this bushing is also identified by the reference numeral 49.

In order to provide for draining hydraulic fluid from a chamber 59 formed by the cooperative relationship of the piston 50 and the cup-shaped cylinder 46, this cylinder 46 is provided adjacent its left-hand end, as viewed in FIG. 1, with a screw-threaded bore for receiving a removable drain plug 60.

Disposed about the piston rod 51 within the cup-shaped cylinder 46 and interposed between the piston 50 and the annular screw-threaded plug 52 is a brake release spring 61 for expelling hydraulic fluid from the chamber 59 when a brake release is effected in a manner hereinafter explained.

In order to prevent the entrance of water, ice and dirt to the interior of the cup-shaped cylinder 46, a rubber boot 62 surrounds the piston rod 51. The opposite ends of the boot 62 are provided with beads which fit respectively around the periphery of the piston rod 51 and into a groove formed in the screw-threaded plug 52 that is secured to the open threaded end of the cylinder 46.

As shown in FIG. 1 of the drawings, one of the hydraulic brake actuators 14 extends below the bolster 5 adjacent the upper end thereof and is disposed between the upper ends of the brake beams 3 and 4. The other brake actuator 14 extends below the bolster 5 adjacent the lower end thereof and is disposed between the brake beams 3 and 4 adjacent the lower ends thereof.

Each of the brake beams 3 and 4 is provided adjacent each of the brake heads 9 with a cavity 63. As shown in FIG. 1, the arm 47 of the upper actuator 14 is disposed in the cavity 63 adjacent the upper brake head 9 provided on brake beam 3 and the arm 47 of the lower actuator 14 is disposed in the cavity 63 adjacent the lower brake head 9 provided on this brake beam 3. Each of these arms 47 is connected to the brake beam 3 by a headed pin 64 that extends through the bushing 49 carried in the bore 48 (FIG. 2) provided therefor in this arm and coaxial bores in the brake beam 3 above and below the respective cavity 63 in this beam 3.

Likewise, the arm 57 of the upper actuator 14 is disposed in the cavity 63 adjacent the upper brake head 9 provided on brake beam 4 and the arm 57 of the lower actuator 14 is disposed in the cavity 63 adjacent the lower brake head 9 provided on this brake beam 4. Each of these arms 57 is connected to the brake beam 4 by a headed pin 65 that extends through the bushing 49 carried in the bore 58 (FIG. 2) provided therefor in this arm and coaxial bores in the brake beam 4 above and below the respective cavity 63 in this beam 4.

The supply of hydraulic fluid under pressure from the hydraulic piston 23, as it is moved in the direction of the right hand in the bottomed bore 19, to the two brake actuators 14 is controlled by a shuttle valve device 66 now to be described.

As shown in FIG. 2 of the drawings, the shuttle valve device 66 comprises a cup-shaped casing 67 that adjacent its open end is provided with internal screw threads for receiving a screw-threaded plug member 68 that has formed therein a square recess 69 for receiving therein a square boss formed at one end of a wrench. When a square boss at the one end of a wrench is inserted in the square recess 69, the plug 68 can be rotated by means of the wrench to increase or decrease a volume chamber 70 above a cup-shaped shuttle valve 71 that is slidably mounted in a bottomed bore 72 provided therefor in the casing 67.

Disposed in the chamber 70 and interposed between the plug 68 and the shuttle valve 71 is a spring 73 that normally biases the shuttle valve 71 against an annular stop member 74 that abuts the lower end of the bottomed bore 72.

Opening into a chamber 75 below the shuttle valve 71 is one end of a pipe 76 that at its opposite end is connected to the pipe 43 at a location on the outlet side of the check valve 44. One end of a second pipe 77 is connected to the pipe 43 intermediate the outlet side of the check valve 44 and the location at which the pipe 76 is connected to this pipe 43. The other end of this pipe 77 opens at the wall surface of the bottomed bore 72 at a location that, as viewed in FIG. 2, is just above a peripheral annular groove 78 formed on the shuttle valve 71 adjacent the lower end thereof.

Opening at the wall surface of the bottomed bore 72 diametrically opposite the location at which the aforesaid other end of the pipe 77 opens at the wall surface of this bottomed bore 72 is one end of a pipe 79 the opposite end of which is connected to the inlet of a one-way flow check valve device 80.

As shown in FIG. 2, connected to the outlet of the check valve device 80 is one end of a pipe 81 the opposite end of which is connected to one inlet of a pipe tee 82. As shown in FIG. 1, connected to the other inlet of the pipe tee 82 is one end of a pipe 83 the opposite end of which opens into the chamber 59 in the brake actuator 14 that is disposed between the brake beams 3 and 4 adjacent the upper ends thereof. Connected to the side outlet of the pipe tee 82 is one end of a pipe 84 the opposite end of which opens into the chamber 59 (FIG. 2) in the brake actuator 14 that is disposed between the brake beams 3 and 4 adjacent the lower ends thereof, as shown in FIG. 1.

In order to control the rate of release of hydraulic fluid from the chambers 59 in the two hydraulic brake actuators so that the rate of release of the braking force from the wheels 1 and 2 on each side of the truck corresponds to that obtained in conventional brake rigging, a choke 85 of a suitable size to provide this desired rate of release is connected in bypassing relation to the check valve device 80. Accordingly, connected to one end of this choke 85 is one end of a pipe 86 that has its opposite end connected to the pipe 79 intermediate the ends thereof, and connected to the other end is one end of a pipe 87 that has its opposite end connected to the pipe 81 intermediate the ends thereof.

As shown in FIG. 2, connected to the pipe 87 intermediate the ends thereof is one end of a pipe 88 that at its opposite end opens at the wall surface of the bottomed bore 72 in the casing 67 at a location that is in alignment with a port 89 in the shuttle valve 71 while this shuttle valve occupies the position shown. The shuttle valve 71 is provided with a second port 90 that is located thereon above the peripheral annular groove 79 and in such a location that, while the spring 73 biases the shuttle valve 71 against the annular member 74, this port 90 is above the location at which the above-mentioned other end of the pipe 77 opens at the wall surface of the bottomed bore 72 and below the location at which one end of a pipe 91 opens at this wall surface. The other end of the pipe 91 opens into the hereinbefore-mentioned hydraulic fluid reservoir 21 in order that hydraulic fluid may flow from the volume chamber 70 to this reservoir 21 in a manner hereinafter explained.

In order to provide, in customary fashion, for operation of the brakes by hand brake means, a hand brake rod 92 is formed integral with one side of the piston 22, it being noted from FIG. 2 that this rod 92 is parallel to and off-set from the master hydraulic piston 23 which is formed integral with the same side of the piston 22 and coaxial therewith. The rod 92 extends through the spring 24 and a bore 93 provided therefor in the wall 25 to the exterior of the casing 17 of the master cylinder 8. This exterior end of the hand brake rod 92 may be connected through a cable and a system of pulleys (not shown) to a hand brake wheel which is located at one end of a railway vehicle. A rubber boot 94 surrounds the hand brake rod 92 to prevent the entrance of foreign matter into the interior of the non-pressure chamber 39 through the bore 93 in the wall 25.

OPERATION

In operation, when it is desired to effect a brake application, pneumatic fluid under pressure is admitted to the chamber 28 (FIG. 2) from the auxiliary reservoir 33 (FIG. 1) or from both the auxiliary reservoir 33 and the emergency reservoir 35 by operation of the brake control valve 31 in response to a service or an emergency rate of reduction of the pressure in the brake pipe 37 under the control of the locomotive engineer or train operator. Pneumatic fluid under pressure thus supplied to the chamber 28, formed between the piston 22 and the pressure head 27, is effective to displace the pistons 22 and 23 in the direction of the right-hand, as viewed in FIG. 2, with respect to the casing 17 against the yielding resistance of the spring 24.

It will be understood that the bottomed bore 19 on the right-hand side of the piston 23, and the pipes 43, 76 and 77, and chamber 75 have been previously filled with hydraulic fluid by flow thereto from the hydraulic fluid reservoir 21 via the one-way flow check valve device 44.

Consequently, as the pistons 22 and 23 continue to be displaced in the direction of the right hand, as viewed in FIG. 2, in response to the supply of pneumatic fluid under pressure to the chamber 28, the hydraulic fluid trapped by the valve device 44 in the bottomed bore 19 will be forced from this bottomed bore through the pipes 43 and 76 to the chamber 75 below the shuttle valve 71. Since a hydraulic fluid is incompressible, a build-up of pressure will occur beneath the shuttle valve 71. When this pressure has increased to a value sufficient to establish a force that exceeds the force of the spring 73, the shuttle valve 71 will be moved upward against the yielding resistance of the spring 73 to a position in which the peripheral annular groove 78 on the shuttle valve 71 is in alignment with the ends of the pipes 77 and 79 that open at the wall surface of the bottomed bore 72 in the casing 67. It should be noted that in this position of the shuttle valve 71, the port 90 therein is in alignment with that end of the pipe 91 that opens at the wall surface of the bottomed bore 72, and the port 89 is out of alignment with that end of the pipe 88 that opens at the wall surface of this bottomed bore 72.

When the shuttle valve 71 is moved upward in the manner just explained to the position in which the peripheral annular groove 78 thereon establishes a communication between the pipes 77 and 79, the continued movement of the pistons 22 and 23 in the direction of the right hand, as viewed in FIG. 2, will cause hydraulic fluid under pressure to flow from the interior of the bottomed bore 19 to the chamber 59 in each of the hydraulic brake actuators 14 via pipes 43 and 77, groove 78 on the shuttle valve 71, pipe 79, one-way flow check valve device 80, pipe 81, pipe tee 82, and pipes 83 and 84.

Hydraulic fluid under pressure thus supplied to the chamber 59 of each brake actuator 14 is effective to move the corresponding piston 50 and cylinder 46 simultaneously in opposite directions.

Since the arm 47 of each cylinder 46 is connected to the brake beam 3 (FIG. 1) by a pin 64, and the end member 55 secured to each piston rod 51 is connected to the brake beam 4 by a pin 65, it is apparent that the above-mentioned simultaneous supply of hydraulic fluid under pressure to the chambers 59 in the two hydraulic brake actuators 14 is effective to move the brake beams 3 and 4 in opposite directions.

As the brake beams 3 and 4 move in opposite directions, the brake shoes 12 carried by these beams are brought into braking contact with the wheels 1, 2 of the truck to effect a braking action on these wheels.

As the brake beams 3 and 4 are moved as described above, these beams are supported and guided by the feet 10 as these feet have sliding contact in the groove in the wear plate and guide members 11. As hereinbefore mentioned, the orientation of the wear plate and guide members 11 is such that the brake beams 3 and 4, and the brake shoes 12 carried thereby, are moved radially toward the wheels.

It will be understood that in view of the symmetrical disposition of the brake actuators 14 on opposite sides of the longitudinal axis of the truck and the corresponding symmetrical relation of the points at which the arms 47 of the cylinder 46 and the end members 55 of the piston rods 51 are anchored to the brake beams 3 and 4, the simultaneous supply of hydraulic fluid at the same pressure to the chambers 59 of both hydraulic brake actuators 14 produces substantially equalized forces of application of the brake shoes 12 to the corresponding wheels.

When it is desired to release the brake application, the brake pipe 37 is recharged in the usual well known manner. As the pressure in the brake pipe 37 is increased, the brake control valve device 31 operates in response thereto to establish a communication between the pipe 30 and atmosphere whereupon the pneumatic fluid under pressure previously supplied to the chamber 28 (FIG. 2) is vented in the usual manner. As the pneumatic fluid under pressure is released from chamber 28, the spring 24 is rendered effective to move the pistons 22 and 23 in the direction of the left hand, as viewed in FIG. 2.

As the piston 23 is thus moved in the direction of the left hand, it tends to form a vacuum in the bottomed bore 19. Consequently, as the hydraulic piston 23 is moved in the direction of the left hand, the springs 46 in the hydraulic brake actuators 14 are rendered effective to move the respective pistons 50 and cylinder 46 in the direction to decrease the volume of the chambers 59 thereby forcing the hydraulic fluid in these chambers to flow to the interior of the bottomed bore 19 via pipes 83 and 84, pipe tee 82, pipes 81 and 87, choke 85, pipes 86 and 79, the peripheral annular groove 78 on the shuttle valve 71 now in its upper position, and pipes 77 and 43. This movement of the pistons 50 and the corresponding cylinders 46 is effective to move the brake beams 3 and 4 (FIG. 1) toward each other and the brake shoes 12 carried thereby correspondingly away from the tread surface of the wheels of the truck to effect a brake release.

Furthermore, as the piston 23 (FIG. 2) is moved in the direction of the left hand, the pressure of the hydraulic fluid in the chamber 75 and acting on the lower side of the shuttle valve 71 is reduced. When the pressure in the chamber 75 is thus reduced to a value less than that of the compressed spring 73, this spring will expand and move the shuttle valve 71 downward so that the peripheral annular groove 78 on this shuttle valve no longer establishes a communication between the pipes 79 and 77.

Moreover, this downward movement of the shuttle valve 71 by the spring 73 causes this shuttle valve to force hydraulic fluid from the chamber 75 to the interior of the bottomed bore 19 via the pipes 76 and 43 until the shuttle valve 71 reaches the position shown in FIG. 2 in which it abuts the annular member 74.

As the shuttle valve 71 is thus moved downward to the position shown, the port 90 is moved to a position to close communication between the volume chamber 70 and the hydraulic fluid reservoir 21 via the pipe 91, and the port 89 is moved to the position shown to establish a communication between the pipe 88 and the volume reservoir 70.

When the shuttle valve 71 is thus moved downward to the position shown in FIG. 2, hydraulic fluid can no longer flow from the chambers 59 to the interior of the bottomed bore 19 via the peripheral annular groove 78 on this shuttle valve. However, upon the return of the shuttle valve 71 to the position shown in FIG. 2, the springs 61 will cause hydraulic fluid to be forced from the chambers 59 to the volume reservoir 70 via the pipes 83 and 84, pipe tee 82, pipes 81, 87 and 88 and port 89 in the shuttle valve 71 until this volume chamber 70 is completely filled with hydraulic fluid.

As the pistons 22 and 23 are moved in the direction of the left-hand, as viewed in FIG. 2, by the spring 24 to the position shown, subsequent to movement of the shuttle valve 71 by the spring 73 to the position in which this shuttle valve is shown, the check valve 44 provides for flow of hydraulic fluid from the hydraulic fluid reservoir 21 to the interior of the bottomed bore 19. Consequently, when the pistons 22 and 23 reach the position shown, the interior of the bottomed bore 19, the pipes 43, 76 and 77, and the chamber 75, have been completely filled with hydraulic fluid from the reservoir 21.

Moreover, the chamber 59 in the hydraulic brake actuators 14, the pipes 83, 84, 81, 87, and 88 and the volume chamber 70 are all likewise completely filled with hydraulic fluid.

It is apparent that upon again effecting a brake application, the shuttle valve 71 will be moved to its upper position in the manner hereinbefore explained in which the port 89 cuts off communication between the pipe 88 and the volume chamber 70 and a communication is established between this volume chamber 70 and the hydraulic fluid reservoir 21 via the port 90 and the pipe 91. Consequently, the hydraulic fluid trapped in the volume reservoir 70 will flow therefrom to the hydraulic fluid reservoir 21 via the port 90 and the pipe 91.

From the foregoing, it is apparent that the volume reservoir 70 is completely filled with hydraulic fluid from the chambers 59 in the hydraulic brake actuators 14 each time a brake release is effected, and thereafter this quantity or volume of hydraulic fluid is released from the volume chamber 70 to the hydraulic fluid reservoir 21 at the time the next brake application is effected.

It is apparent that should the brake shoes 12 and/or the wheels associated therewith wear while a brake application is in effect, the pneumatic fluid under pressure in the chamber 28 will move the pistons 22 and 23 in the direction of the right hand, as viewed in FIG. 2. This movement of the piston 23 in the direction of the right hand is effective to force hydraulic fluid under pressure from the interior of the bottomed bore 19 to the chambers 59 in the hydraulic brake actuators 14 via pipes 43 and 77, peripheral annular groove 78 on the shuttle valve 71, which is in its upper position while a brake application is in effect, pipe 79, one-way check valve device 80, pipe 81, pipe tee 82 and pipes 83 and 84. Consequently, hydraulic fluid under pressure is supplied to the chambers 59 in the brake actuators 14 as the volume of these chambers increase as the result of brake shoe and/or wheel wear so that these chambers 59 are completely filled with hydraulic fluid under pressure whenever a brake release is initiated.

Since the same quantity of hydraulic fluid is always released from the chambers 59 to the volume reservoir 70 whenever a brake release is effective, it is apparent that the brake shoes 12 are always moved the same distance away from the tread surface of the corresponding wheels irrespective of the increase in the volume of these chambers 59 as the result of the brake shoe and/or wheel wear occurring while the previous brake application was in effect. Consequently, a constant brake shoe clearance is maintained throughout the useful life of the brake shoes.

It will be noted that it is not necessary to use a slack adjuster with this type of brake rigging. It should be understood that the length of the bore in the cylinder 46 of the brake actuators 14 is such as to provide sufficient travel for the pistons 50 in addition to that required to effect contact of the brake shoes 12 with the wheel treads, that as these brake shoes wear away, the shoes are always properly moved into braking contact with the wheels of the truck during each brake application throughout their useful life without the necessity of a slack adjuster to compensate for wear of the shoes.

When a pair of brake shoes 12 adjacent the opposite ends of a hydraulic brake actuator 14 have completely worn out and are to be replaced with new shoes, it is necessary to reduce the distance between the corresponding pins 64 and 65 since the thickness of the new brake shoes is greater than that of the worn shoes, it being remembered that the brake rigging constituting the present invention maintains a constant brake shoe clearance irrespective of the degree of wear of the brake shoes. The distance between the pins 64 and 65 may be reduced, while the brakes are released, by a workman first applying a wrench to the lock nut 56 and thereafter rotating the wrench in the direction to move this lock nut 56 away from the corresponding end member 55 and along the screw threads 53 on the piston rod 51.

Next, the workman will apply the wrench to the wrench-receiving hexagon 54 formed on the rod 51. Thereafter, the workman will rotate, by means of the wrench, the piston rod 51 and piston 50 in the direction to cause the screw threads 53 on the piston rod 51 to move into the internally threaded bottomed bore in the corresponding end member 55, it being remembered that this end member 55 is prevented from rotating by the corresponding pin 65 which connects this end member 55 to the brake beam 4. Since the spring 61 constantly exerts equal but opposite forces on the piston 50 and the cylinder 46, the arm 47 of which is connected to the brake beam 3 by the corresponding pin 64 so that this cylinder 46 is prevented from rotating, it is apparent that rotation of the piston rod 51 and piston 50 by the wrench applied to the hexagon 54 formed on this piston rod 51 so that the screw threads 53 on this rod 51 are moved into the internally threaded bottomed bore in the corresponding end member 55 is effective to reduce the distance between the pins 64 and 65 (FIG. 1).

From the foregoing, it is apparent that the workman by use of the wrench, can cause the distance between each pair of the pins 64 and 65 to be reduced sufficiently to enable him to replace the worn brake shoes with new brake shoes. By first driving the brake shoe keys 13 upward by the application of a series of hammer blows to the lower end (not shown) of each key, the workman may remove this key and thereafter the corresponding worn out brake shoe 12. The new brake shoes can then be secured to the brake heads 9 by means of these same brake shoe keys 13.

Having now described the invention, what I claim as new and desire to secure by Letters Patent, is:

1. A brake rigging for a four-wheel type of railway vehicle truck having two spaced-apart side frames disposed on opposite sides of a longitudinal axis and each perpendicular to a transverse axis of the truck, said brake rigging comprising:
    a. two brake-shoe-carrying brake beams extending in spaced substantially parallel relation to the transverse axis of the vehicle truck, and guidably supported at the ends thereof on the side frames of the truck for bodily movement longitudinally of the truck, each of said brake beams having adjacent each end thereof a cavity out of which extends in opposite directions a pair of coaxial bores, wherein the improvement comprises,
    b. a pair of hydraulic brake actuators each disposed between the two wheels on one side of the truck and having a pair of oppositely extending arms, the pair of arms of each actuator being disposed in the cavities at one end of said brake beams and respectively operatively connected to said brake beams, and
    c. a hydraulic-pneumatic master cylinder carried by one of said brake beams and operatively responsive to the application and release of pneumatic pressure to cause the supply and release of hydraulic fluid under pressure to and from said brake actuators whereby said actuators, in response to said supply of hydraulic fluid under pressure thereto, effect movement of said brake beams in opposite directions to a brake applying position with respect to said wheels of the truck.

2. A brake rigging for a four-wheel type of railway vehicle truck, as recited in claim 1, further characterized by a hydraulic fluid reservoir, and a one-way flow check valve device controlling flow from said hydraulic fluid reservoir to said hydraulic-pneumatic master cylinder.

3. A brake rigging for a four-wheel type of railway vehicle truck, as recited in claim 1, further characterized by valve means operatively responsive to a chosen hydraulic pressure established by said master cylinder to provide for flow of hydraulic fluid under pressure from said master cylinder to said hydraulic brake actuators to effect movement of said brake beams to said brake applying position.

4. A brake rigging for a four-wheel type of railway vehicle truck, as recited in claim 1, further comprising:
    a. a hydraulic fluid reservoir,
    b. a one-way flow check valve device providing for flow of hydraulic fluid from said reservoir to said hydropneumatic master cylinder and preventing flow in the opposite direction, and
    c. valve means operatively responsive to a chosen hydraulic pressure established by said master cylinder to provide for flow of hydraulic fluid under pressure from said master cylinder to said hydraulic brake actuators to effect movement of said brake beams to said brake applying position.

5. A brake rigging for a four-wheel type of railway vehicle truck, as recited in claim 1, further comprising:
    a. a hydraulic fluid reservoir,
    b. a volume chamber, and
    c. valve means operatively responsive to a chosen hydraulic pressure established by said master cylinder from a first position in which a communication is established between said hydraulic brake actuators and said volume chamber and a communication is closed between said volume chamber and said hydraulic fluid reservoir to a second position in which said communication between said actuators and said volume chamber is closed, and said communication between said volume chamber and said hydraulic fluid reservoir is established whereby upon successive brake releases and subsequent applications, a fixed quantity of hydraulic fluid is successively released from said actuators to said volume chamber and thence from said volume chamber to said hydraulic fluid reservoir whereby said actuators are enabled to maintain a constant brake shoe clearance between said brake shoes carried by said brake beams and the vehicle wheels associated with the respective brake shoes.

6. A brake rigging for a four-wheel type of railway vehicle truck, as recited in claim 3, further characterized by a one-way flow check valve device providing for flow from said valve means to said brake actuators, and choke means disposed in bypassing relation to said check valve device to control the rate of release of hydraulic fluid from said brake actuators and thereby the rate of release of a brake application.

7. A brake rigging for a four-wheel type of railway vehicle truck, as recited in claim 3, further characterized in that said valve means comprises:
    a. a casing having a bore and a plurality of ports opening into said bore, two of which ports open at the wall surface of said bore diametrically opposite each other and are connected respectively to said hydraulic brake actuators and said hydraulic-pneumatic master cylinder, b. a grooved valve element slidably mounted in said bore and movable from a first position in which communication is closed between said two ports to a second position in which said grooved valve element establishes communication between said two ports via said groove to provide for flow of hydraulic fluid from said hydraulic-pneumatic master cylinder to said hydraulic brake actuators, and c. resilient means normally biasing said grooved valve element to said first position.

8. A brake rigging for a four-wheel type of railway vehicle truck, as recited in claim 7, further characterized in that a third one of said plurality of ports opens at one end of said bore and is connected to said hydraulic-pneumatic master cylinder whereby said grooved valve element is moved from said first position to said second position upon the establishment of said chosen hydraulic pressure by said master cylinder.

9. A brake rigging for a four-wheel type of railway vehicle truck, as recited in claim 7, further characterized in that a pair of said plurality of ports is connected respectively to said brake actuators and said hydraulic fluid reservoir, and said grooved valve element is provided with means which, while said valve element occupies its said first position, cooperates with one of said pair of ports of said plurality of ports in said casing that is connected to said hydraulic brake actuators to provide for flow of hydraulic fluid from said actuators to said bore in said casing, and, while said valve element occupies its said second position, cooperates with the other of sid pair said ports of said plurality of ports in said casing that is connected to said hydraulic fluid reservoir to provide for flow of hydraulic fluid from said bore in said casing to said hydraulic fluid reservoir whereby, upon each brake release, the same quantity of hydraulic fluid is released from said brake actuators, irrespective of the quantity of hydraulic fluid supplied to said brake actuators as the result of brake shoe wear occurring during the prior brake application, thereby enabling the maintenance of constant brake shoe clearance while the brakes are released.

10. A brake rigging for a four-wheel type of railway vehicle truck, as recited in claim 7, further characterized in that said grooved valve element comprises a cylindrical cup-shaped member having adjacent one end a peripheral annular groove, and a pair of ports, one of which is disposed adjacent said peripheral annular groove and extends from the peripheral surface of said cylindrical cup-shaped member to the interior thereof, and the other of which is disposed adjacent the other end of said member and extends from the peripheral surface thereof to said interior.

11. A brake rigging for a four-wheel type of railway vehicle truck, as recited in claim 7, further characterized in that one end of said bore in said casing is provided with internal screw threads, and a rotatable screw-threaded member has screw threaded engagement with said internal screw threads, said member having means for effecting manual rotation thereof in one direction or in an opposite direction to provide a variable volume which, while said valve element occupies its said first position, receives hydraulic fluid from said brake actuators upon effecting a brake release, said variable volume enabling the provision of variable brake shoe clearance.

* * * * *